US012703644B2

(12) United States Patent
Yu et al.

(10) Patent No.: US 12,703,644 B2
(45) Date of Patent: Aug. 11, 2026

(54) ALUMINUM-DOPED CATHODE MATERIAL PRECURSOR, AND PREPARATION METHOD THEREFOR AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(*) Notice: Subject to any disclaimer, the term of this patent is extended or adjusted under 35 U.S.C. 154(b) by 197 days.

(21) Appl. No.: 18/682,143

(22) PCT Filed: Dec. 1, 2022

(86) PCT No.: PCT/CN2022/135782

§ 371 (c)(1),
(2) Date: Feb. 8, 2024

(87) PCT Pub. No.: WO2023/142667

PCT Pub. Date: Aug. 3, 2023

(65) Prior Publication Data

US 2025/0122094 A1 Apr. 17, 2025

(30) Foreign Application Priority Data

Jan. 28, 2022 (CN) ........................ 202210104794.0

(51) Int. Cl.
*C01G 53/40* (2025.01)

(52) U.S. Cl.
CPC .......... *C01G 53/40* (2013.01); *C01P 2004/03* (2013.01); *C01P 2004/32* (2013.01);
(Continued)

(58) Field of Classification Search
CPC .. C01G 53/40; C01P 2004/03; C01P 2004/32; C01P 2004/61; C01P 2006/11; C01P 2006/12; C01P 2006/40
See application file for complete search history.

(56) References Cited

FOREIGN PATENT DOCUMENTS

| | | | |
|---|---|---|---|
| CN | 103178262 A | * | 6/2013 |
| CN | 105742568 A | | 7/2016 |

(Continued)

OTHER PUBLICATIONS

English machine translation of Song (CN 109473667 A). (Year: 2019).*

(Continued)

*Primary Examiner* — Paul A Wartalowicz
*Assistant Examiner* — Nicholas A. Piro
(74) *Attorney, Agent, or Firm* — Westbridge IP LLC

(57) ABSTRACT

The present disclosure discloses an aluminum-doped cathode material precursor, and a preparation method therefor and use thereof. The preparation method includes: adding a solution of mixed salts of nickel, cobalt, and calcium, a first aluminum-containing alkali solution, aqueous ammonia, and a sodium hydroxide solution to a medium solution to allow a reaction, and subjecting a resulting reaction product to solid-liquid separation (SLS) to obtain a filter cake; soaking (Continued)

the filter cake in a second aluminum-containing alkali solution, and conducting SLS to obtain a solid material; subjecting the solid material to calcination to obtain a calcined material, and soaking the calcined material in water to obtain the aluminum-doped cathode material precursor. The precursor of the present disclosure realizes the co-precipitation of nickel, cobalt, and aluminum, and by adopting subsequent dechlorination, decalcification, and dehydration, a material with a porous structure is gradually formed which has a low tap density.

12 Claims, 1 Drawing Sheet

(52) U.S. Cl.
CPC ....... *C01P 2004/61* (2013.01); *C01P 2006/11* (2013.01); *C01P 2006/12* (2013.01); *C01P 2006/40* (2013.01)

(56) References Cited

FOREIGN PATENT DOCUMENTS

| | | | | |
|---|---|---|---|---|
| CN | 106992285 A | | 7/2017 | |
| CN | 109473667 A | * | 3/2019 | ........ H01M 10/0525 |

OTHER PUBLICATIONS

English machine translation of Li (CN 103178262 A). (Year: 2013).*

International search report of PCT Patent Application No. PCT/CN2022/135782 issued on Feb. 22, 2023.

* cited by examiner

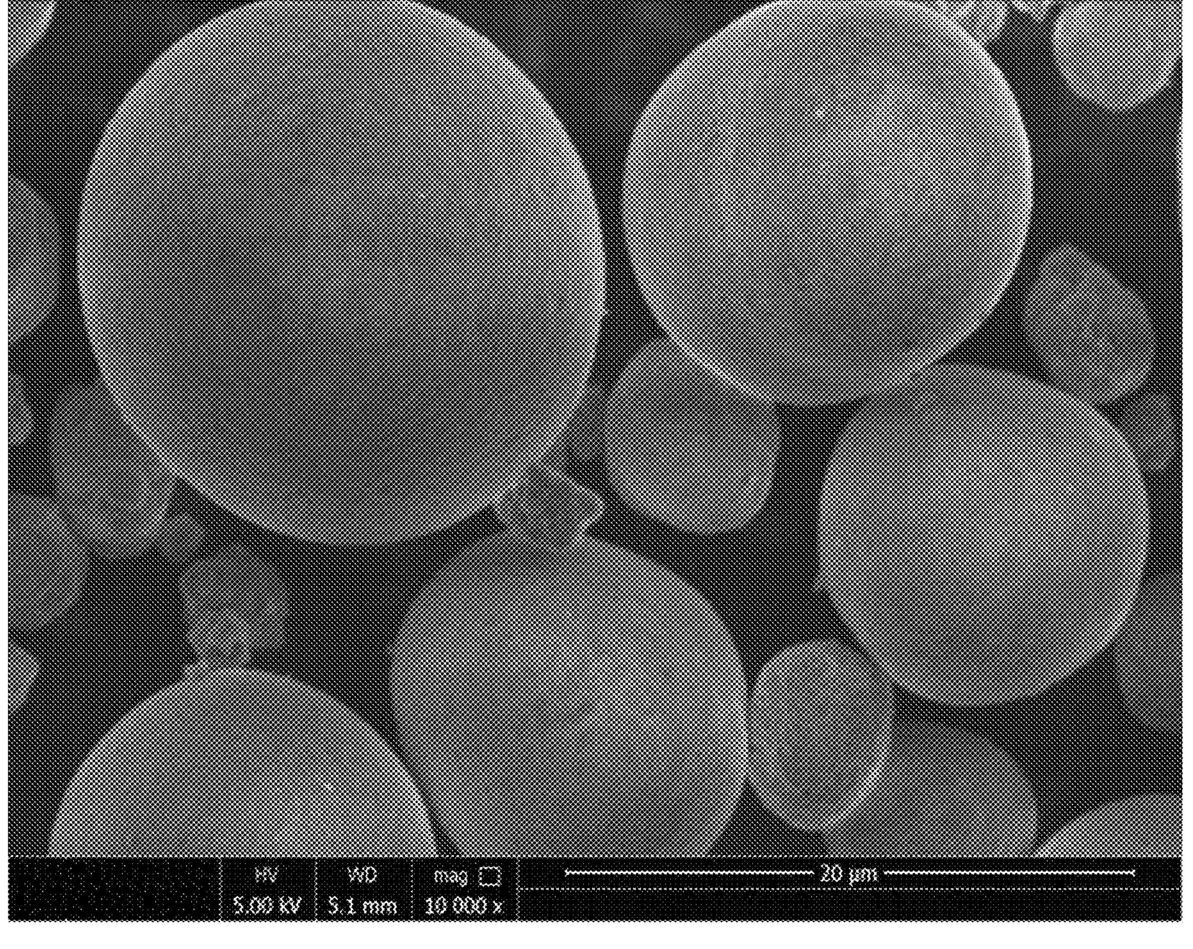
HV
5.00 kV
WD
5.1 mm
mag
10 000 x
20 µm

ALUMINUM-DOPED CATHODE MATERIAL PRECURSOR, AND PREPARATION METHOD THEREFOR AND USE THEREOF

TECHNICAL FIELD

The present disclosure belongs to the technical field of lithium-ion batteries (LIBs), and in particular relates to an aluminum-doped cathode material precursor, and a preparation method therefor and a use thereof.

BACKGROUND

LIBs are widely used due to their advantages such as prominent cycling performance, high capacity, low price, convenient use, safety, and environmental friendliness. With the increasing market demand for high-performance (such as high-energy density) batteries and the continuous popularization of electric vehicles, the market demand for battery cathode materials has presented a rapid growth trend. Ternary cathode materials are the most potential and promising materials among the current mass-produced cathode materials due to their characteristics such as high energy density, relatively-low cost, and excellent cycling performance. Therefore, it is urgent to improve the performance of ternary precursors.

There are many methods to prepare a precursor. At present, the co-precipitation synthesis method is most commonly used, where a raw material solution, a precipitating agent solution, and a complexing agent solution are concurrently fed into a reactor under a protective gas to obtain a multi-element precursor such as a binary precursor and a ternary precursor.

Al doping can stabilize a layered structure of a material to improve the cycling life and thermal stability of the material. A layered structure of an NCA layered material is relatively stable compared with other materials, but the material still will undergo structural changes and capacity loss during a charge-discharge process due to the reduction of O—Ni—O interlayer spacing during phase transition. In particular, many NCA materials currently prepared have a relatively high tap density and a compact internal structure, and are prone to uneven volume change during a charge-discharge process, resulting in irreversible capacity loss of the materials.

At present, lithium nickel cobalt aluminum oxide is mainly prepared by a one-step or multi-step co-precipitation method, with an inorganic aluminum salt and an inorganic nickel-cobalt salt as metal sources and an inorganic alkali (sodium hydroxide or aqueous ammonia) as a precipitating agent.

A preparation method for a nickel-cobalt-aluminum ternary precursor is disclosed in the related art, where an aluminum ingot is allowed to react with excess sodium hydroxide to prepare a sodium metaaluminate solution, and then the sodium metaaluminate solution, a nickel-cobalt salt aqueous solution, a complexing agent, and a precipitating agent are added to a reactor to allow a reaction to obtain a nickel-cobalt-aluminum hydroxide.

Since aluminum ions are basically not complexed with ammonia, and a solubility product constant of aluminum hydroxide is $1.9\times10^{-33}$ that is much smaller than those of nickel hydroxide and cobalt hydroxide, aluminum hydroxide can easily nucleate independently to generate a white gelatinous precipitate with a very small particle size, which makes the overall precipitate have a wide particle size range and leads to uneven precipitation and poor morphology. As a result, sintering processes for preparing NCA ternary cathode materials cannot be routine and unified, and different sintering processes need to be adopted for different production batches, which affects the quality stability and production efficiency.

SUMMARY

The following is a summary of the subject matter described in detail herein. This summary is not intended to limit the scope of protection of claims.

The present disclosure provides an aluminum-doped cathode material precursor, and a preparation method therefor and use thereof. The precursor material has a lower tap density and is relatively loose inside the particle, which facilitates the sintering with a lithium source.

According to an aspect of the present disclosure, an aluminum-doped cathode material precursor is provided, where the aluminum-doped cathode material precursor has a chemical formula of $Ni_xCo_yAl_zO_{x+y+1.5z}$, where $0.85\leq x\leq0.98$, $0<y\leq0.15$, and $0<z\leq0.15$; the aluminum-doped cathode material precursor is a spherical or spheroidal particle, and the particle has a porosity of 0.05 $cm^3/g$ to 0.2 $cm^3/g$; and the aluminum-doped cathode material precursor has a particle size D50 of 8.0 μm to 20.0 μm, a specific surface area (SSA) of 18 $m^2/g$ to 35 $m^2/g$, and a tap density of 1.4 $g/cm^3$ to 1.8 $g/cm^3$.

In some embodiments of the present disclosure, a degree of sphericity index Φ of the particles may be 1.0 to 1.3, where Φ=Dc/Di, Di represents a radius of maximum inscribed circle of the particle, and Dc represents a radius of minimum circumscribed circle of the same particle.

The present disclosure also provides a preparation method for the aluminum-doped cathode material precursor described above, including the following steps:

S1: dissolving an aluminum salt in a sodium hydroxide solution to prepare a first aluminum-containing alkali solution;

S2: concurrently feeding a solution of mixed salts of nickel, cobalt, and calcium, the first aluminum-containing alkali solution, aqueous ammonia, and a sodium hydroxide solution into a medium solution to allow a reaction, and controlling a temperature, pH, and an ammonia concentration of a resulting reaction system; and when a particle size of a reaction product reaches a target value, stopping the feeding, and conducting solid-liquid separation (SLS) to obtain a filter cake;

S3: soaking the filter cake in a second aluminum-containing alkali solution, and conducting SLS to obtain a solid material; and S4: subjecting the solid material to calcination to obtain a calcined material, soaking the calcined material in water, and conducting SLS to obtain the aluminum-doped cathode material precursor.

In some embodiments of the present disclosure, in S1, the sodium hydroxide solution may have a concentration of 1 mol/L to 2 mol/L, and a molar concentration of Al in the first aluminum-containing alkali solution may be 0.1 mol/L to 0.8 mol/L. According to a nickel/cobalt/aluminum ratio in the target product, a flow rate ratio of the solution of mixed salts to the first aluminum-containing alkali solution is fixed.

In some embodiments of the present disclosure, in S2, a molar quantity of calcium ions in the solution of mixed salts may be 2±0.1 times a molar quantity of aluminum ions in the aluminum salt.

In some embodiments of the present disclosure, in S2, a total molar concentration of nickel, cobalt, and calcium ions in the solution of mixed salts may be 1.0 mol/L to 2.5 mol/L.

In some embodiments of the present disclosure, the solution of mixed salts may be prepared from soluble salts of nickel, cobalt, and calcium, and the soluble salts of nickel, cobalt, and calcium may each be at least one of a nitrate or a chloride; and the aluminum salt may be at least one of a nitrate or a chloride.

In some embodiments of the present disclosure, in S2, the medium solution may be a mixed solution of sodium hydroxide and aqueous ammonia, and the medium solution may have a pH of 12.0 to 14.0 and an ammonia concentration of 2.0 g/L to 5.0 g/L.

In some embodiments of the present disclosure, in S2, the reaction may be conducted at a temperature of 45° C. to 65° C., a pH of 10.8 to 11.5, and an ammonia concentration of 2.0 g/L to 5.0 g/L.

In some embodiments of the present disclosure, in S2, the aqueous ammonia may have a concentration of 6.0 mol/L to 12.0 mol/L.

In some embodiments of the present disclosure, in S3, the soaking may be conducted for 1 h to 2 h.

In some embodiments of the present disclosure, in S3, a concentration of Al in the second aluminum-containing alkali solution may be 0.1 mol/L to 0.8 mol/L.

In some embodiments of the present disclosure, in S4, the soaking may be conducted for 1 h to 2 h.

In some embodiments of the present disclosure, in S4, the calcination may be conducted at 580° C. to 650° C. for 1 h to 4 h.

In some embodiments of the present disclosure, in S4, a liquid-to-solid ratio of the water to the calcined material may be (5,000-15,000) L/t.

In some embodiments of the present disclosure, in S4, when the calcined material is soaked in water, ammonium chloride can be added to adjust a pH to 6 to 7, and then the calcined material is washed with water. The addition of ammonium chloride can reduce the water consumption.

The present disclosure also provides use of the aluminum-doped cathode material precursor described above in an LIB.

According to a preferred embodiment of the present disclosure, the present disclosure at least has the following beneficial effects:

1. In the present disclosure, in order to avoid that aluminum hydroxide nucleates independently to cause uneven precipitation when an NCA precursor is prepared through co-precipitation, a solution of mixed salts of nickel, cobalt, and calcium and an aluminum-containing alkali solution are subjected to co-precipitation by a Friedel's salt precipitation method to generate a nickel-cobalt-calcium-aluminum co-precipitate, then chloride ions or nitrate ions in the solid material are removed with an aluminum-containing alkali solution, and then the solid material is calcined and dehydrated, and soaked in pure water to remove calcium ions to finally obtain a nickel-cobalt-aluminum oxide precursor.

Reaction equations for the co-precipitation are as follows:

$$Ni^{2+}+2OH^{-}=Ni(OH)_2\downarrow$$

$$Co^{2+}+2OH^{-}=Co(OH)_2\downarrow$$

$$4OH^{-}+4Ca^{2+}+2[Al(OH)_4]^{-}+2Cl^{-}=Ca_4Al_2Cl_2(OH)_{12}\downarrow$$

A reaction equation for the soaking in the aluminum-containing alkali solution is as follows:

$$3Ca_4Al_2Cl_2(OH)_{12}+2[Al(OH)_4]^{-}+4OH^{-}=4Ca_3Al_2(OH)_{12}+6Cl^{-}$$

A reaction equation for the calcination is as follows:

$$Ca_3Al_2(OH)_{12}=3CaO+Al_2O_3+6H_2O$$

A reaction equation for the soaking in the pure water is as follows:

$$CaO+H_2O=Ca(OH)_2$$

2. The NCA precursor material prepared by this technical solution realizes the co-precipitation of nickel, cobalt, and aluminum, and by adopting the subsequent dechlorination, decalcification, and dehydration, a material with porous structure is gradually formed, which has a low tap density, and is beneficial to the diffusion of a lithium source when sintering is conducted with the lithium source subsequently to prepare a cathode material.

3. Due to the co-precipitation of calcium and aluminum, the degree of sphericity of the obtained product has been greatly improved, that is, the particle of the product has a relatively regular degree of sphericity, which improves the tap density of the material.

Other aspects can be apparent upon reading and understanding the drawings and detailed description.

BRIEF DESCRIPTION OF THE DRAWINGS

The drawings are used to provide a further understanding of the technical solution herein and form part of the description, and are used together with the examples of the present disclosure to interpret the technical solutions herein, and do not constitute a limitation on the technical solution herein. The present disclosure is further described below with reference to accompanying drawings and examples.

The sole FIGURE is a scanning electron microscopy (SEM) image of the NCA precursor material prepared in Example 1 of the present disclosure.

DETAILED DESCRIPTION

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

An aluminum-doped cathode material precursor was prepared in this example, including the following steps:

(1) according to a required molar ratio of nickel, cobalt, aluminum, and calcium, namely, 0.85:0.1:0.05:0.1, chlorides of nickel, cobalt, aluminum, and calcium were respectively adopted as raw materials to prepare a solution of mixed salts of nickel, cobalt, and calcium first in which a total molar concentration of metal ions was 2.5 mol/L;

(2) a sodium hydroxide solution with a concentration of 1.5 mol/L was prepared, and the aluminum chloride in step (1) was dissolved in the sodium hydroxide solution to prepare an aluminum-containing alkali solution in which a molar concentration of Al was 0.12 mol/L;

(3) aqueous ammonia with a concentration of 12.0 mol/L was prepared as a complexing agent;

(4) a medium solution was added to a reactor until a stirring paddle at a bottom was immersed, where the medium solution was a mixed solution of sodium hydroxide and aqueous ammonia, and had a pH of 14.0 and an ammonia concentration of 5.0 g/L;

(5) the solution of mixed salts prepared in step (1), the aluminum-containing alkali solution prepared in step (2), the aqueous ammonia prepared in step (3), and a sodium hydroxide solution were concurrently fed into the reactor to allow a reaction at a temperature of 65° C., a pH of 11.5, and an ammonia concentration of 5.0 g/L;

(6) when it was detected that D50 of a resulting material in the reactor reached 20.0 μm, the feeding was stopped;

(7) the material in the reactor was subjected to SLS to obtain a filter cake;

(8) the filter cake was soaked for 2 h in an aluminum-containing alkali solution with an Al molar concentration of 0.8 mol/L, and then SLS was conducted to obtain a solid material;

(9) the solid material was calcined at 650° C. for 4 h to obtain a calcined material;

(10) the calcined material was soaked in pure water for 2 h with a pure water/calcined material ratio of 10,000 L/t, and then SLS was conducted to obtain a wet material; and

(11) the wet material was dried, sieved, and demagnetized to obtain the NCA precursor material.

The precursor had a chemical formula of $Ni_{0.85}Co_{0.1}Al_{0.05}O_{1.025}$, and was in a morphology of spherical or spheroidal particles, which had a porosity of 0.05 $cm^3/g$, D50 of 20.0 μm, an SSA of 21 $m^2/g$, a tap density of 1.7 $g/cm^3$, and a degree of sphericity index Φ of 1.05.

The degree of sphericity index was determined by an Image-Pro Plus (IPP) degree of sphericity analysis method. With the IPP software, several target particles were selected in an SEM image, the radius of maximum inscribed circle Di and the radius of minimum circumscribed circle Dc were determined for the particles in the two-dimensional (2D) image, and the degree of sphericity index Φ was calculated by Dc/Di.

Example 2

An aluminum-doped cathode material precursor was prepared in this example, and a specific preparation process was as follows:

(1) according to a required molar ratio of nickel, cobalt, aluminum, and calcium, namely, 0.9:0.05:0.05:0.1, chlorides of nickel, cobalt, aluminum, and calcium were respectively adopted as raw materials to prepare a solution of mixed salts of nickel, cobalt, and calcium first in which a total molar concentration of metal ions was 1.5 mol/L;

(2) a sodium hydroxide solution with a concentration of 1.0 mol/L was prepared, and the aluminum chloride in step (1) was dissolved in the sodium hydroxide solution to prepare an aluminum-containing alkali solution in which a molar concentration of Al was 0.14 mol/L;

(3) aqueous ammonia with a concentration of 9.0 mol/L was prepared as a complexing agent;

(4) a medium solution was added to a reactor until a bottom stirring paddle was immersed, where the medium solution was a mixed solution of sodium hydroxide and aqueous ammonia, and had a pH of 13.0 and an ammonia concentration of 3.5 g/L;

(5) the solution of mixed salts prepared in step (1), the aluminum-containing alkali solution prepared in step (2), the aqueous ammonia prepared in step (3), and a sodium hydroxide solution were concurrently fed into the reactor to allow a reaction at a temperature of 55° C., a pH of 11.2, and an ammonia concentration of 3.5 g/L;

(6) when it was detected that D50 of a resulting material in the reactor reached 14.0 μm, the feeding was stopped;

(7) the material in the reactor was subjected to SLS to obtain a filter cake;

(8) the filter cake was soaked for 1.5 h in an aluminum-containing alkali solution with an Al molar concentration of 0.4 mol/L, and then SLS was conducted to obtain a solid material;

(9) the solid material was calcined at 620° C. for 2 h to obtain a calcined material;

(10) the calcined material was soaked in a small amount of pure water, ammonium chloride was added to adjust a pH to 6.5, then the calcined material was washed with pure water in a pure water/calcined material ratio of 5,000 L/t, and SLS was conducted to obtain a wet material; and

(11) the wet material was dried, sieved, and demagnetized to obtain the NCA precursor material.

The precursor had a chemical formula of $Ni_{0.9}Co_{0.05}Al_{0.05}O_{1.025}$, and was in a morphology of spherical or spheroidal particles, which had a porosity of 0.1 $cm^3/g$, D50 of 14.0 μm, an SSA of 28 $m^2/g$, a tap density of 1.6 $g/cm^3$, and a degree of sphericity index Φ of 1.22.

Example 3

An aluminum-doped cathode material precursor was prepared in this example, and a specific preparation process was as follows:

(1) according to a required molar ratio of nickel, cobalt, aluminum, and calcium, namely, 0.95:0.03:0.02:0.04, nitrates of nickel, cobalt, aluminum, and calcium were respectively adopted as raw materials to prepare a solution of mixed salts of nickel, cobalt, and calcium in which a total molar concentration of metal ions was 1.0 mol/L;

(2) a sodium hydroxide solution with a concentration of 2.0 mol/L was prepared, and the aluminum nitrate in step (1) was dissolved in the sodium hydroxide solution to prepare an aluminum-containing alkali solution in which a molar concentration of Al was 0.1 mol/L;

(3) aqueous ammonia with a concentration of 6.0 mol/L was prepared as a complexing agent;

(4) a medium solution was added to a reactor until a bottom stirring paddle was immersed, where the medium solution was a mixed solution of sodium hydroxide and aqueous ammonia, and had a pH of 12.0 and an ammonia concentration of 2.0 g/L;

(5) the solution of mixed salts prepared in step (1), the aluminum-containing alkali solution prepared in step (2), the aqueous ammonia prepared in step (3), and a sodium hydroxide solution were concurrently fed into the reactor to allow a reaction at a temperature of 45° C., a pH of 10.8, and an ammonia concentration of 2.0 g/L;

(6) when it was detected that D50 of a resulting material in the reactor reached 8.0 μm, the feeding was stopped;

(7) the material in the reactor was subjected to SLS to obtain a filter cake;

(8) the filter cake was soaked for 1 h in an aluminum-containing alkali solution with an Al molar concentration of 0.1 mol/L, and then SLS was conducted to obtain a solid material;

(9) the solid material was calcined at 580° C. for 1 h to obtain a calcined material;

(10) the calcined material was soaked in pure water for 1 h with a pure water/calcined material ratio of 15,000 L/t, and then SLS was conducted to obtain a wet material; and

(11) the wet material was dried, sieved, and demagnetized to obtain the NCA precursor material.

The precursor had a chemical formula of $Ni_{0.95}Co_{0.03}Al_{0.02}O_{1.01}$, and was in a morphology of spherical or spheroidal particles, which had a porosity of 0.14 $cm^3/g$, D50 of 8.0 μm, an SSA of 31 $m^2/g$, a tap density of 1.47 $g/cm^3$, and a degree of sphericity index Φ of 1.16.

Test Example

The precursor materials obtained in Examples 1 to 3 were each thoroughly mixed with lithium hydroxide according to a molar ratio of lithium to a total of nickel, cobalt, and aluminum of 1.8:1, and a resulting mixture was then calcined at 800° C. for 12 h in an oxygen atmosphere to obtain a corresponding cathode material.

The cathode material obtained above was used to assemble a button battery, and the battery was subjected to an electrochemical performance test. Specifically, with N-methylpyrrolidone (NMP) as a solvent, a cathode active material, acetylene black, and polyvinylidene fluoride (PVDF) were thoroughly mixed in a mass ratio of 8:1:1, coated on an aluminum foil, blow-dried at 80° C. for 8 h, and then vacuum-dried at 120° C. for 12 h; and a battery was assembled in an argon-protected glove box, with a lithium sheet as a negative electrode, a polypropylene (PP) membrane as a separator, and 1 M LiPF6-EC/DMC (1:1, v/v) as an electrolyte. The test was conducted at a current density of 1 C=160 mA/g and a charge/discharge cut-off voltage of 2.7 V to 4.3 V. The cycling performance at a current density of 1 C was tested, and results were shown in Table 1.

TABLE 1

| | Discharge capacity at 0.1 C, mAh/g | Specific discharge capacity after 100 cycles, mAh/g | Cycling retention rate |
|---|---|---|---|
| Example 1 | 211 | 201.3 | 95.4% |
| Example 2 | 217 | 201.6 | 92.9% |
| Example 3 | 224 | 204.8 | 91.4 |
| NCA material commercially available ($LiNi_{0.85}Co_{0.10}Al_{0.05}O_2$) | 210 | 187.9 | 89.48% |

It can be seen from Table 1 that, compared with the NCA material commercially available, Example 1 leads to significantly higher cycling retention rate. This is because the method of Example 1 leads to more uniform co-precipitation and high degree of sphericity, and makes the material have a porous structure, which is beneficial to the diffusion of a lithium source during sintering with the lithium source, thereby improving the electrochemical performance of the material.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples and features in the examples in the present disclosure may be combined with each other in a non-conflicting situation.

The invention claimed is:

1. A preparation method for an aluminum-doped cathode material precursor, comprising the following steps:

S1: dissolving an aluminum salt in a sodium hydroxide solution to prepare a first aluminum-containing alkali solution;

S2: concurrently feeding a solution of mixed salts of nickel, cobalt, and calcium, the first aluminum-containing alkali solution, aqueous ammonia, and a sodium hydroxide solution into a medium solution to allow a reaction, and controlling a temperature, a pH, and an ammonia concentration of a resulting reaction system; and when a particle size of a reaction product reaches a target value, stopping the feeding, and conducting solid-liquid separation (SLS) to obtain a filter cake;

S3: soaking the filter cake in a second aluminum-containing alkali solution, and conducting SLS to obtain a solid material; and S4: subjecting the solid material to calcination to obtain a calcined material, soaking the calcined material in water, and conducting SLS to obtain the aluminum-doped cathode material precursor, wherein the aluminum-doped cathode material precursor has a chemical formula of $Ni_xCo_yAl_zO_{x+y+1.5z}$, with $0.85 \leq x \leq 0.98$, $0<y \leq 0.15$, and $0<z \leq 0.15$; the aluminum-doped cathode material precursor is a spherical or spheroidal particle having a porosity of 0.05 $cm^3/g$ to 0.2 $cm^3/g$; and the aluminum-doped cathode material precursor has a particle size D50 of 8.0 μm to 20.0 μm, a specific surface area of 18 $m^2/g$ to 35 $m^2/g$, and a tap density of 1.4 $g/cm^3$ to 1.8 $g/cm^3$.

2. The preparation method according to claim 1, wherein in S1, a concentration of sodium hydroxide in the sodium hydroxide solution is 1 mol/L to 2 mol/L, and a molar concentration of Al in the first aluminum-containing alkali solution is 0.1 mol/L to 0.8 mol/L.

3. The preparation method according to claim 1, wherein in S2, a molar quantity of calcium ions in the solution of mixed salts is 2±0.1 times a molar quantity of aluminum ions in the aluminum salt.

4. The preparation method according to claim 1, wherein in S2, a total molar concentration of nickel, cobalt, and calcium ions in the solution of mixed salts is 1.0 mol/L to 2.5 mol/L.

5. The preparation method according to claim 1, wherein the solution of mixed salts is prepared from soluble salts of nickel, cobalt, and calcium, and the soluble salts of nickel, cobalt, and calcium are each at least one of a nitrate or a chloride; and the aluminum salt is at least one of a nitrate or a chloride.

6. The preparation method according to claim 1, wherein in S2, the medium solution is a mixed solution of sodium hydroxide and aqueous ammonia, and the medium solution has a pH of 12.0 to 14.0 and an ammonia concentration of 2.0 g/L to 5.0 g/L.

7. The preparation method according to claim 1, wherein in S2, the reaction is conducted at a temperature of 45° C. to 65° C., a pH of 10.8 to 11.5, and an ammonia concentration of 2.0 g/L to 5.0 g/L.

8. The preparation method according to claim 1, wherein in S3, the soaking is conducted for 1 h to 2 h.

9. The preparation method according to claim 1, wherein in S3, a concentration of Al in the second aluminum-containing alkali solution is 0.1 mol/L to 0.8 mol/L.

10. The preparation method according to claim 1, wherein in S4, the calcination is conducted at 580° C. to 650° C. for 1 h to 4 h, and a liquid-to-solid ratio of the water to the calcined material is (5,000-15,000) L/t.

11. The preparation method according to claim 1, wherein in S4, when the calcined material is soaked in water, ammonium chloride is added to adjust a pH to 6 to 7, and then the calcined material is washed with water.

12. A preparation method for an aluminum-doped cathode material precursor, comprising the following steps:

S1: dissolving an aluminum salt in a sodium hydroxide solution to prepare a first aluminum-containing alkali solution;

S2: concurrently feeding a solution of mixed salts of nickel, cobalt, and calcium, the first aluminum-containing alkali solution, aqueous ammonia, and a sodium hydroxide solution into a medium solution to allow a reaction, and controlling a temperature, a pH, and an ammonia concentration of a resulting reaction system; and when a particle size of a reaction product reaches a target value, stopping the feeding, and conducting solid-liquid separation (SLS) to obtain a filter cake;

S3: soaking the filter cake in a second aluminum-containing alkali solution, and conducting SLS to obtain a solid material; and S4: subjecting the solid material to calcination to obtain a calcined material, soaking the calcined material in water, and conducting SLS to obtain the aluminum-doped cathode material precursor, wherein the aluminum-doped cathode material precursor has a chemical formula of $Ni_xCo_yAl_zO_{x+y+1.5z}$, with $0.85 \leq x \leq 0.98$, $0 \leq y < 0.15$, and $0 < z \leq 0.15$; the aluminum-doped cathode material precursor is a spherical or spheroidal particle having a porosity of 0.05 $cm^3/g$ to 0.2 $cm^3/g$; and the aluminum-doped cathode material precursor has a particle size D50 of 8.0 μm to 20.0 μm, a specific surface area of 18 $m^2/g$ to 35 $m^2/g$, a tap density of 1.4 $g/cm^3$ to 1.8 $g/cm^3$ and a degree of sphericity index Φ of the particle is 1.0 to 1.3, wherein Φ=Dc/Di, Di represents a radius of maximum inscribed circle of the particle, and Dc represents a radius of minimum circumscribed circle of the same particle.

* * * * *